United States Patent [19]
Voss et al.

[11] 3,985,961
[45] Oct. 12, 1976

[54] METHOD FOR THE TIME DIVISION MULTIPLEX TRANSMISSION OF DATA

[75] Inventors: Hans Heinrich Voss, Munich; Karl Georg Dieter, Konigsdorf; Konrad Reisinger, Zorneding, all of Germany

[73] Assignee: Siemens Aktiengesellschaft, Munich, Germany

[22] Filed: Mar. 17, 1975

[21] Appl. No.: 559,078

[30] Foreign Application Priority Data
Mar. 18, 1974 Germany............................ 2412962

[52] U.S. Cl. ....................... 179/15 AF; 179/15 BA; 178/69.5 R
[51] Int. Cl.² ........................................... H04J 3/06
[58] Field of Search ....... 179/15 AF, 15 BS, 15 BA; 178/69.5 R

[56] References Cited
UNITED STATES PATENTS
3,830,980   8/1974   Peron et al...................... 179/15 BS

*Primary Examiner*—Thomas A. Robinson
*Attorney, Agent, or Firm*—Gerald L. Lett

[57] ABSTRACT

A method for transmitting data according to time division multiplex principles is described. In each multiplex frame synchronizing bits and data bits are transmitted from a multiplexer at the transmitter over a transmission device to a multiplexer at the receiver. In each time division multiplex frame a constant number of data bits are transmitted. The synchronism of the transmitter and receiver multiplexing devices and the transmission devices located at the transmitter and receiver are established by altering the duration of the time division multiplex frame.

10 Claims, 7 Drawing Figures

METHOD FOR THE TIME DIVISION MULTIPLEX TRANSMISSION OF DATA

BACKGROUND OF THE INVENTION

The invention relates to a method for the time division multiplex (t.d.m) transmission of data in accordance with which, in each t.d.m. frame, a plurality of synchronizing bits and data bits are transmitted from a transmitting-end multiplex device via a transmission device to a receiving-end multiplex device.

An object of the invention is to ensure synchronism of the multiplex devices with the transmission device with the least possible cost for equipment.

SUMMARY OF THE INVENTION

In accordance with the invention, the foregoing and other objects are achieved in that, for each t.d.m. frame, a constant number of data bits are transmitted, and the synchronism of the multiplex devices and the transmission device is established by altering the duration of the t.d.m. frame.

In order to establish synchronism in a particularly economical way, it is advantageous to produce, in the region of the transmitting-end multiplex device and in the region of the receiving-end multiplex device, signals which in each t.d.m. frame contain not only a constant number of synchronizing bits and data bits, but also a constant number of blank bits, and preferably just one single blank bit. The signal with the aid of which the data are transmitted across the transmission link contains, in addition to a constant number of synchronizing bits and data bits, a variable number of blank bits. The signal transmitted across the transmission link can contain either no blank bits or one single blank bit or two blank bits.

In order to establish the synchronism of the transmitting-end multiplex device and the transmission device it is advantageous to change the duration of the t.d.m. frame at the transmitting end after the data which are to be transmitted have been emitted from the transmitting end multiplex device and before the data are conducted to the transmission device.

In order to establish the synchronism of the transmission device and the receiving-end multiplex device, it is advantageous to change the duration of the t.d.m. frame at the receiving end after the signal which has been fed into the transmission path has been received and before the data are forwarded to the receiving-end multiplex device.

BRIEF DESCRIPTION OF THE DRAWINGS

In the following, preferred embodiments of apparatus for performing the method of the invention will be described making reference to FIGS. 1 to 7, in which identical components represented in several figures are characterised by the same references.

DETAILED DESCRIPTION OF THE DRAWINGS

Figure 1:
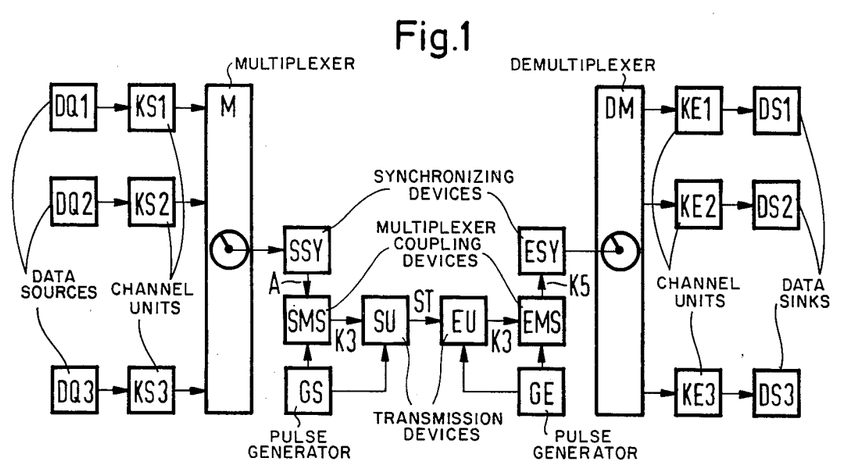
FIG. 1 is a block-schematic circuit diagram of a data transmission system.

FIG. 1 illustrates data sources DQ1, DQ2, DQ3, for example teleprinter subscribers, teleprinter exchanges, punched tape scanning devices, punched card scanning devices, all of known construction. To simplify the illustration only three data sources have been shown, whereas in practice approximately a hundred such data sources can be provided. The transmitting-end multiplex device comprises channel units KS1, KS2, KS3, a multiplexer M, a synchronizing device SSY, a transmitting-end multiplexer coupling device SMS and a pulse generator GS. With the exception of the coupling device all of the foregoing components are of known construction. The data of the data sources are intermediately stored in the channel units before the individual bits are brought into phase. The multiplexer M connects in turn the outputs of the channel units to the transmitting-end synchronizing device SSY. If, for example, 240 data sources and corresponding channel units are provided, the t.d.m. frame bringing-into-phase operation can be effected in such manner that for each t.d.m. frame one conductive connection of a channel unit to the synchronizing device SSY is established and one bit is transmitted.

Figure 2:
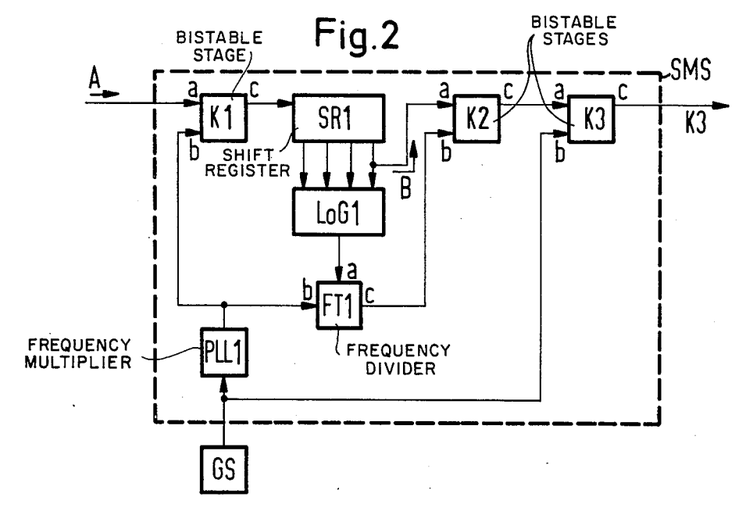
FIG. 2 is a block-schematic diagram of a transmitting-end multiplexer coupling device.

The output signal of the multiplexer coupling device SMS is conducted to the transmission device SU and is then transmitted via the transmission link ST to the receiving-end transmission device EU. The transmission devices SU and EU are in the form of known transmission devices matched to the transmission link ST and are not discussed in detail herein. The output of the receiving-end transmission device EU is connected to the receiving-end multiplex device, composed of the receiving-end multiplexer coupling device EMS, receiving-end synchronizing device ESY, generator GE, demultiplexer DM and receiving-end channel units KS1, KS2, KS3. The same number of receiving-end channel units KE1 to KE3 as transmitting-end channel units KS1 to KS3 are provided. The channel units KE1 to KE3 again cause the data to be intermediately stored before it is passed to the corresponding data sinks DS1, DS2, and DS3. The data sinks can for example, be in the form of teleprinter subscribers, teleprinter exchanges, punched-tape punchers, punched card punchers, all of known construction FIG. 2 shows in more detail the multiplexer coupling device SMS which has been schematically illustrated in FIG. 1. It comprises trigger stages K1, K2, K3, shift register SR1, logic circuit LOG1, frequency divider FT1 and frequency multiplier PLL1. The trigger stages K1, K2, K3 are bistable switching stages, each having two inputs $a$ and $b$ and one output $c$. During the 0 and 1 states, respectively, they emit a 0 and 1 signal via the output $c$. A transition from the 0 state to the 1 state is effected with a 1-signal at the input $a$ in the case of a positive edge of the signal supplied via the input $b$. A transition from the 1 state to the 0 state is effected in the event of a 0-signal at the input $a$, again with a positive edge of the signal present at the input $b$.

Figure 3:
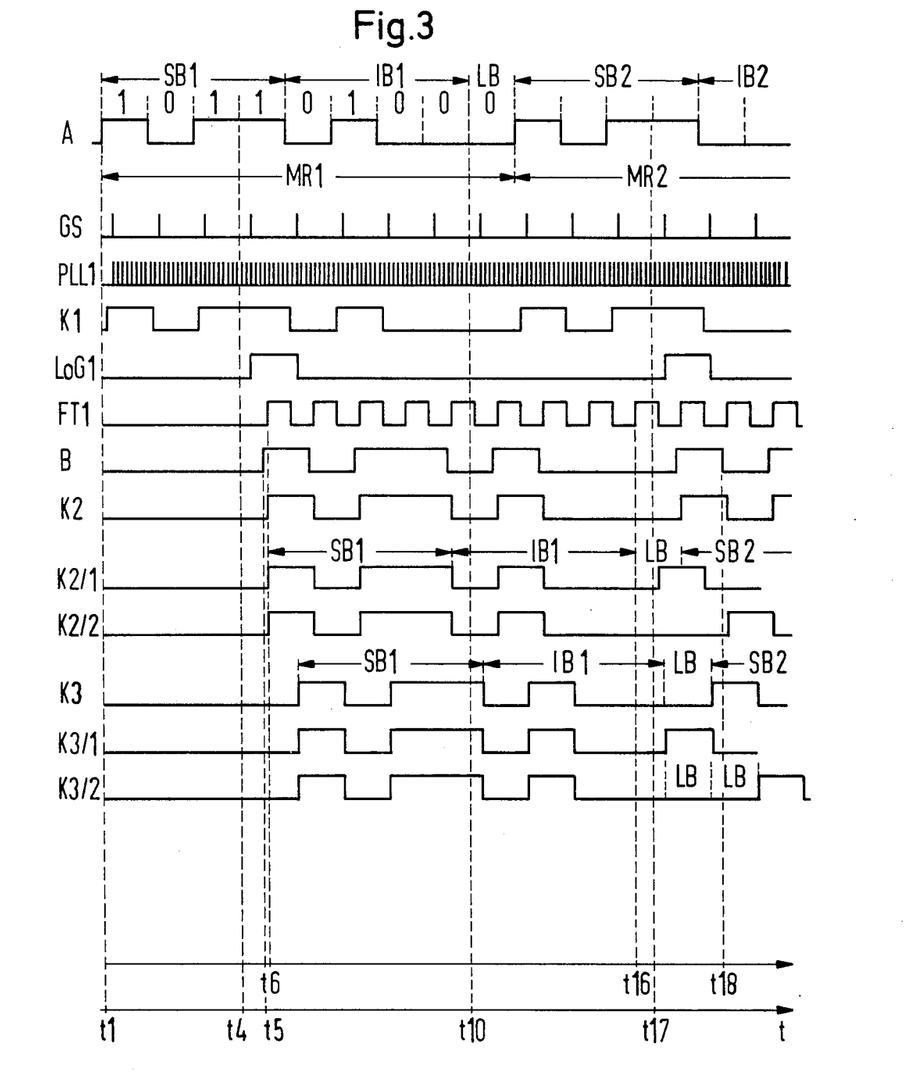
FIG. 3 is a waveform diagram illustrating signals which occur during the operation of the transmitting-end devices.

In the following the mode of operation of the multiplexer coupling device SMS shown in FIG. 2 will be explained with reference to the signals illustrated in FIG. 3. The abscissa direction relates to the time $t$. The upper part of FIG. 3 again represents the signal A which is supplied to the input of the multiplexer coupling device SMS. During a first multiplex frame MR1 the signal A consists of the synchronizing bits SB1 1011, of the data bits 0100 and the blank bit LB. To simplify the drawing only relatively few synchronizing bits and data bits have been represented. Partially shown following the first multiplex frame is the second multiplex frame MR2 with the synchronizing bits SB2 and a few data bits 1B2. Most of the signals represented in FIG. 3 are provided with the same references as the devices from which they are emitted. For example, the signal emitted from the generator GS is likewise referenced GS. In the frequency multiplier PLL1 the signal PLL1 is produced from signal GS, and its pulse repetition frequency can, for example, be 32 times greater than the pulse repetition frequency of the signal GS. The signal PLL1 serves to pulse the trigger stage K1 from whose output the signal K1 is emitted which is equal to the signal A, but slightly displaced in phase in relation to the latter.

The output signal of the trigger stage K1 is conducted to the shift register SR1 which contains as many stages as synchronizing bits are provided. The synchronizing bits are thus stored in the individual stages of the shift register SR1 and coupled in parallel to the logic circuit LOG1 which carries out a constant check as to whether a given synchronizing word, or in the present case the word 1011, is present or not. If this word is present, the signal LOG1=1 is emitted via the output of the like-referenced logic circuit LOG1.

The frequency divider FT1 possesses a resetting input $a$, an input $b$ and an output $c$. The pulses of the signal PLL1 are conducted to the input $b$. The frequency divider FT1 is set in such manner that the signal FT1 emitted via its output $c$ possesses a positive pulse edge which lies in the middle of the signal LOG1=1. The signal LOG1=1 is produced in such manner that the center of this signal LOG1=1 coincides with the middle of the synchronizing bit which commences at the time $t4$.

The signal FT1 serves as timing signal for the trigger stage K2, whose input $a$ is also connected to the last stage of the shift register SR1 so that the signal B is supplied. The signal B is identical to the signal A although it is displaced by a constant amount in relation to the latter. Although it has been assumed that the bit pattern of the signal A is independent of the bit pattern of the signals FT1 and K2, the signal K2 from the time $t6$ until the time $t16$ is equal to the signal A from the time $t1$ until the time $t10$, i.e., until the end of the last bit of the data bits IB1.

The signals A and K2 need in no way be identical in respect of the blank bit LB, because at the time $t17$ a signal LOG1=1 is again emitted, and the frequency divider FT1 is reset again. With regard to the signal K2 it has been assumed that no phase shift of the signal FT1 has occurred after the time $t17$. Under this condition, the signal K2 consists of the synchronizing bits SB1, the data bits IB1, the blank bit LB and the adjoining synchronizing bits SB2.

Generally speaking, after the time $t17$, a phase shift of the signal FT1 will occur so that the phase state of the signal K2 also shifts. In the case of the signal K2/1 it has been assumed that, instead of the blank bit LB, there is a pulse which starts at the time $t16$ and ends at the time $t17$. In this case the last data bit ends again at the time $t16$ whereupon there is a short pause, and the synchronizing bits SB2 commence from the time $t17$ onwards. In the case of the signal K2/2 it has been assumed that in place of the blank bit LB there is a pause which commences at the time $t16$ and ends at the time $t18$. The data bits IB1 thus again extend until the time $t16$, when there is a somewhat longer pause, and after the time $t18$, the synchronizing bits SB2 commence.

The trigger stage K3 is supplied with the signal GS as a timing signal so that the pulse edges of the signal K3, emitted via the output of the trigger stage K3, coincide with the pulses of the signal GS. The signal K2 corresponds to the signal K3, in the case of which the data bits IB1 are followed by the blank bit LB and then by the synchronizing bits SB2. The signal K3/1 corresponds to the signal K2/1 in the case of which the data bits B1 are immediately followed, without a pause, by the synchronizing bits SB2. The signal K3/2 corresponds to the signal K2/2, in the case of which the synchronizing bits IB1 are followed by two blank bits LB and then the synchronizing bits SB2. In all cases the signals K3, K3/1 and K3/2 are matched to the bit pattern of the signal GS. Thus the multiplexer coupling device SMS fulfills the function, in dependence upon the signal A which is determined by the bit pattern of the transmitting-end multiplex device, of producing one of the signals K3 or K3/1 or K3/2 which are determined on the basis of the bit patterns of the generator GS and the transmission device SU.

Figure 4:
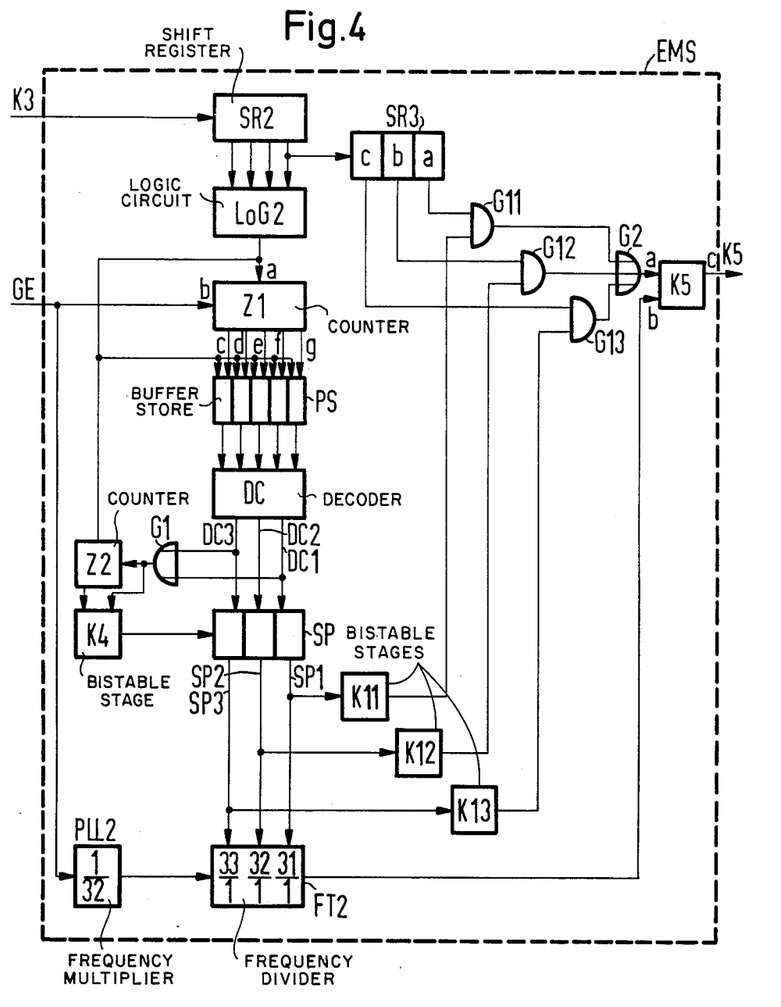
FIG. 4 is a block-schematic circuit diagram of a multiplex coupling device arranged at the receiving end.
Figure 5:
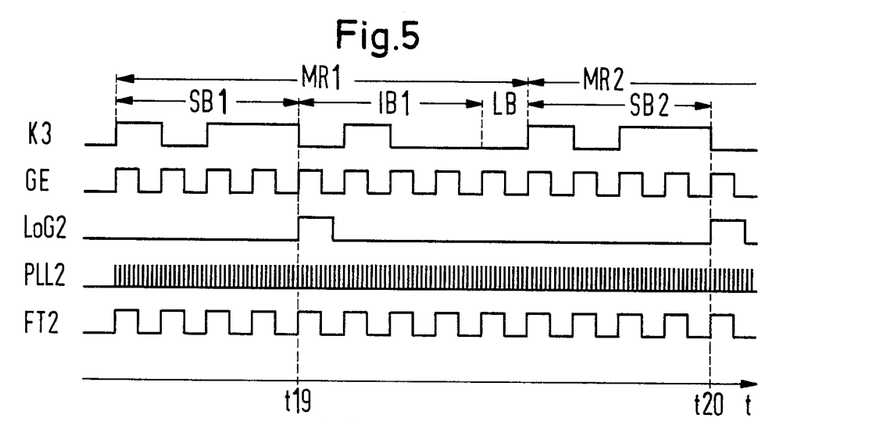
FIGS. 5, 6, and 7 are waveform diagrams illustrating signals which occur during the operation of the receiving-end devices.
Figure 6:
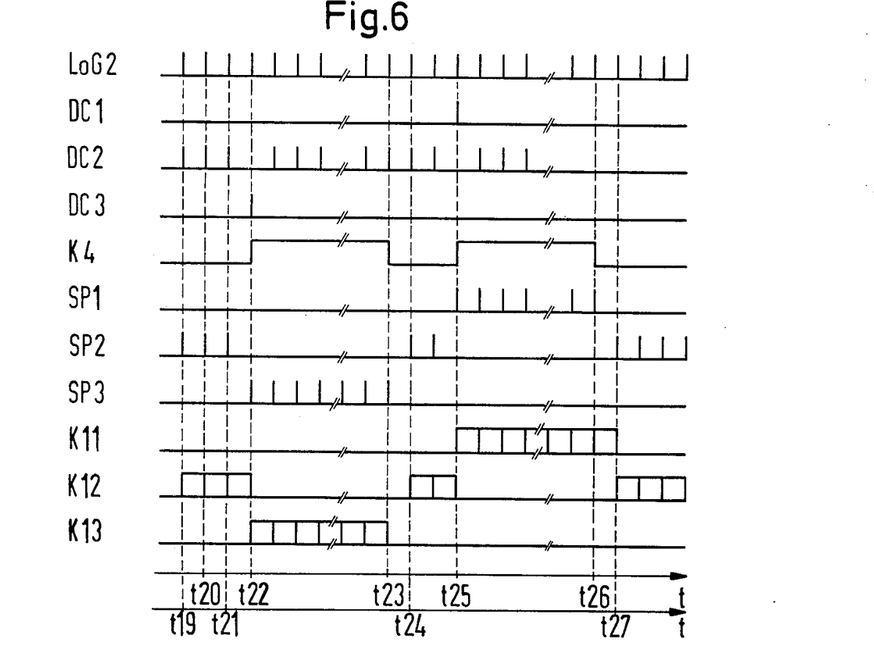

Using the transmission devices SU and EU the signal K3 is transmitted via the transmission link ST, and at the receiving end, is conducted to the receiving-end multiplexer coupling device EMS which is shown in detail in FIG. 4. FIG. 5 and FIG. 6 illustrate a few signals which occur during the operation of the multiplexer coupling device EMS.

The signal K3, or possibly also the variants of this signal K3/1 or K3/2, are conducted to the shaft register SR2 which is illustrated in FIG. 4 and which contains as many stages as synchronizing bits are provided. The synchronizing bits are stored in the cells of the shift register and are coupled in parallel to the logic circuit LOG2 which carries out a constant check as to whether the given synchronizing word, in the following case the word 1011, is present or not. If this word is present, the signal LOG2=1 which bears the same reference is emitted via the output of the logic circuit LOG2.

The counter Z1 possesses a resetting input $a$, a counter input $b$ and outputs $c, d, e, f, g$. With the signal LOG2=1 which is conducted to the input $a$, the counter Z1 is reset. Subsequently, it counts the number of pulses of the signal GE which have been supplied via the input $b$, and via the outputs $c$ to $g$ emits binary signals which characterize the relevant count. In the present case, to simplify the illustration only five outputs $c$ to $g$ have been entered. Each of these outputs $c$ to $g$ is connected to one stage of buffer store PS and, with the signal LOG2=1, the relevant count is transferred to the buffer store PS. Using the counter Z1, the duration of the multiplex frame and in fact commencing from the end of the synchronizing bits SB1 at the time $t19$ until the end of the synchronizing bits SB2 at the time $t20$ is determined. For example, during this interval $t20 - t19$ a total of 256 pulses of the signal GE can be counted, if the signal K3, as shown in the top of FIG. 5, contains one single blank bit LB. If, however, the signal K3 does not contain a blank bit LB or contains two blank bits LB, then under the given conditions there would be a count of 255 or 257. The counts stored in the buffer store PS thus characterize the duration of the multiplex frames and signal the absence or presence of a blank bit LB or the presence of two blank bits LB.

The decoder DC decodes only three counts and characterizes these counts with the signals DC1, DC2, DC3. If, for example, there is a count of 256, the signals DC1=0, DC2=1 and DC3=0 are emitted, and it is thus signalled that the t.d.m. frame has its normal length with one blank bit LB. With the signals DC1=1, DC2=0 and DC3=0 and with DC1=0, DC2=0, DC3=1 it is in each case signalled that there is a count of 255 and of 257, respectively.

FIG. 6 shows a few signals in a time scale which is different from that in FIG. 5. In particular the individual pulses of the signal LOG2 in FIG. 6 are substantially shorter than those in FIG. 5. It will be assumed that from the time $t19$ until the time $t21$ there are t.d.m. frames with one single blank bit which is indicated by the signals DC1, DC2, DC3. At the time $t22$, a t.d.m. frame with two blank bits is established, and via the gate G1, the signal DC3=1 is conducted to the counter Z2 and to the trigger stage K4. It will be assumed that until the time $t22$ the trigger stage K4 emits the signal K4=0 during its rest state. With the signal DC3=1 the trigger stage K4 is set in its operative state in which it emits the signal K4=1. The counter Z2 is constantly supplied with the pulses of the signal LOG2, as counter pulses. At the time $t22$, the counter Z2 obtains the signal DC3=1, and it starts to count. At a counted value, which is adjustable, counter Z2 emits a signal to the trigger stage K4. For example, it will be assumed that at the count 32 the counter Z2 emits a signal to the trigger stage K4 and resets this trigger stage K4 to its reset state.

The store SP comprises three storage cells in which it stores signals DC1, DC2, DC3 which are present at the times $t22$ and $t23$. These times $t22$ and $t23$ are fixed by the pulse edges of the signal K4. At the time $t22$, the signal DC3=1 is thus stored and is emitted as signal SP3=1 until the time $t23$. Similarly, at the time $t23$, the signal DC2=1 is stored and emitted as signal SP2 from the time $t24$. This signal SP2 is not changed until either the signal DC1=1 or the signal DC3=1 occurs. It has been assumed that at the time $t25$ the signal DC1=1 occurs, so that at this time the operative state of the trigger stage K4 is reintroduced, and at the time $t26$, using the counter Z3, the rest state is re-established. From the time $t25$ until the time $t26$ the signal SP1=1 is emitted, and it is thus signalled that a t.d.m. frame did not contain any blank bits.

Thus, the signals SP1, SP2, and SP3 signal during 32 t.d.m. frames that a previous t.d.m. frame did not have any blank bits, had one blank bit or had two blank bits, respectively.

From the signal GE the frequency multiplier PLL2 produces a signal PLL2 whose pulse repetition frequency is a multiple of the pulse repetition frequency of the signal GE. For example, the ratio of the pulse repetition frequencies of the signals GE and PLL2 can be 1:32. The signal PLL2 is conducted to the frequency divider FT2 whose division ratio is controlled in dependence upon the signals SP1, SP2, SP3 and which, via its output, emits the signal FT2 which normally is identical to the signal GE. With the signals SP1=1, SP2=0, SP3=0, and SP1=0, SP2=1, SP3=0, and with SP1=0, SP2=0, SP3=1, under the given conditions the frequency divider FT2 sets a division ratio of 31:1, and of 32:1 and of 33:1, respectively. In the case of the division ratios 33:1 and 31:1 the signal emitted from the output of the frequency divider differs from the signal FT2. These modified signals cannot be represented however in the scale used in FIG. 5. With a division ratio of 31:1 and 33:1 however, the period duration of the signal FT is shortened and lengthened, respectively, in relation to the signal FT2 shown in FIG. 5.

The trigger stages K11, K12, and K13 store the signals SP1, SP2, and SP3, respectively, with which they have been supplied, each for the duration of one t.d.m. frame, resulting in the illustrated signals K11, K12, and K13. The last stage of the shift register SR2 is connected to the shift register SR3, whose storage cells store successively the individual bits of the signal K3. Using the gates G11, G12, G13, G2, only one of the signals stored in shift register SR3 is conducted to the trigger stage K5 which operates in the same way as the trigger stages K1 to K3. When the signal SP1=1 is present, which indicates that the t.d.m. frame is too short and contains no blank bit, then, using the gate G11 the signal is taken from the storage cell $c$ of the shift register SR3. When the signal SP3=1 is present, which indicates that the t.d.m. frame is too long and contains two blank bits, then, using the gate G13 the cell $a$ of the shift register SR3 is connected, and when the signal SP2=1 is present and the t.d.m. frame has the normal length with one single blank bit, then using the gate G12 the cell $b$ of the shift register SR3 is connected. In all three cases the signal emitted from the trigger stage K5 is identical to the signal K3 illustrated in FIG. 7. It thus has one single blank position LB and is characterized in that when this signal K3 is transmitted over further transmission links, a signal with one single blank bit is already present. It is therefore, no longer necessary to transform a signal without a blank bit into a signal with a blank bit.

Figure 7:
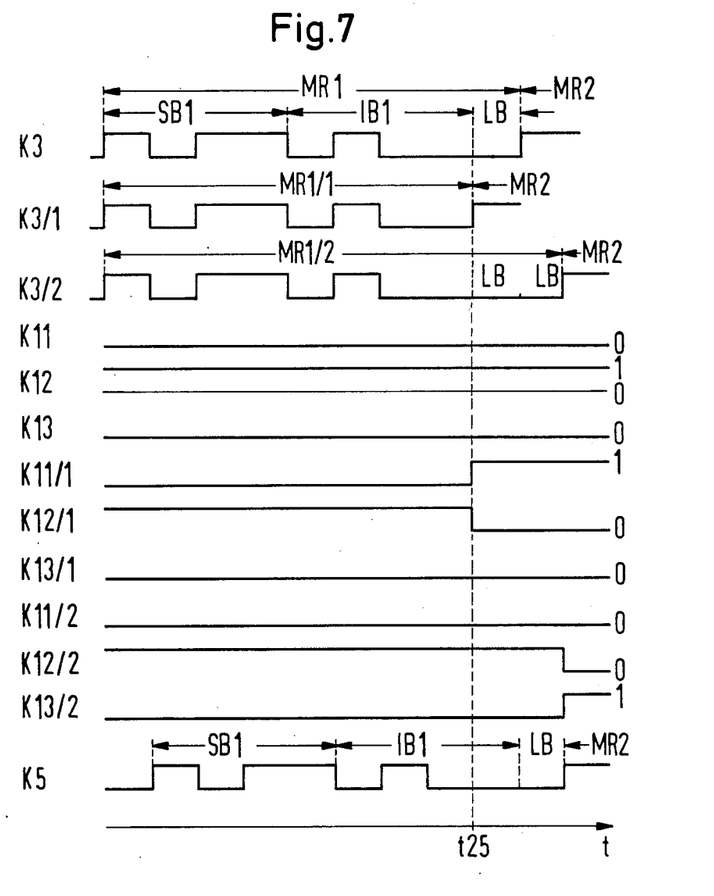

FIG. 7 shows a few signals illustrating the times of switch-over. The signals K3, and K3/1 and K3/2 again relate to the cases with a blank bit LB, and with no blank bit, and with two blank bits LB. In the case of the signal K3 the signals K11=0, K12=1 and K13=0 are produced. In the case of the signal K3/1 the signals K11/1, K12/1, K13/1 are produced, and in the case of the signal K3/2 the signals K11/2, K12/2, K13/2 are produced.

While the signal K3 is being supplied to the multiplexer coupling device EMS, there is no occasion to change this bit pattern. In this case the division ratio 32:1 is set in the frequency divider FT2, and the signal emitted from the frequency divider FT2 has the same bit pattern as the signal K3. Under this condition, the cell $b$ of the shift register SR3 emits the signal K3 via the gates G12, G2 to the input $a$ of the trigger stage K5, and, with the signal of the frequency divider FT2, a bringing-into-phase is effected which, however, in this normal case does not result in any change in the bit pattern. Via the output $c$ of the trigger stage K5, the signal K5 illustrated in the lower part of FIG. 7 is emitted.

If the signal K3/1 is present, the bit pattern of the signal FT2 must be altered in order to interpose a blank bit immediately following the data bits. For this purpose at the time $t25$ entered in FIGS. 6 and 7, with the signal K12/1=0 the gate G12 is blocked, and the conductive connection of the cell $b$ of the shift register SR3 to the gate G2 is suppressed. At the same time, at the instant $t25$, with the signal K11/1=1 the gate G1 is opened, and thus, a conductive connection of the cell *a* of the shift register SR3 to the gate G2 is established. From the time *t*25, however, the divider ratio 31:1 of the frequency divider FT2 is also set, so that up until the time *t*27 during 32 t.d.m. frames the signal K5 is emitted with shortened bit pattern spacings. In each t.d.m. frame a relative shift of 1/32 of the duration of one bit is carried out once only. In this way the two bit patterns of the signal K3/1 and of the signal FT2 shift in relation to one another. Before a bit is emitted twice from cell *a* of the shift register SR3, after 32 t.d.m. frames, using the signal K12 and the gate G12 a switch-back is made to cell *b* of the shift register SR3. Consequently, the first considered normal situation prevails once more.

If the signal K3/2 is present, one of the two blank bits LB of the signal K3/2 must be suppressed. For this purpose using the gate K13 and the gate G13, during 32 t.d.m. frames a switch-over is made to cell *c* of the shift register SR3. During this time the signal K5 emitted from the trigger stage K5 is emitted with lengthened bit patter spacings and then a switch-over is made to cell *b* of the shift register SR3 whereupon the normal situation is reintroduced.

The preferred embodiment described hereinabove is intended only to be exemplary of the various embodiments of the apparatus which might be used to carry out the method of the invention. It is contemplated that the described apparatus can take various forms while operating according to the method defined by the appended claims.

We claim as our invention:

1. In apparatus for time division multiplex (TDM) transmission of data between a first system and a second system asynchronous therewith, said first system including a transmitter multiplexer and said second system including data transmission units in the transmitter and receiver of said second system, a method of correcting synchronizing errors during the transmission of data comprising the steps of:
   generating in said first system a first data signal comprising within a TDM frame a predetermined first number of synchronizing bits, a predetermined second number of information bits and a predetermined third number of blank bits,
   producing a rectangular phase position signal, the duration of which is equal to the bit period and the phase position of which is dependent on the phase position of said synchronizing bits and which is positioned such that one edge of the phase position signal has the same phase position as said synchronizing bits,
   coupling said first data signal to a first bistable circuit which is controlled by said phase position signal, said first bistable circuit producing a second data signal,
   applying said second data signal to a second bistable circuit which is controlled in accordance with the clock frequency of said second system, said second bistable circuit producing a third data signal which in addition to said predetermined first number of synchronizing bits and said second number of information bits contains a variable number of blank bits,
   forming a TDM frame of predetermined duration responsive to said synchronizing bits and producing a TDM frame signal indicating the TDM frame,
   counting the clock frequency of said second signal throughout the duration of said TDM frame and producing blank bit signals indicating the number of blank bits appearing throughout the duration of said TDM frame in addition to said synchronizing bits and said information bits,
   storing said third data signal in storage locations from the outputs of which bit-displaced data signals may be taken which are time displaced by at least as many bits as blank bits appearing per TDM frame, and
   gating the outputs of said storage location under the control of said blank bit signals so as to produce a gated data signal containing a constant number of blank bits.

2. The method defined in claim 1 comprising the additional steps of:
   extracting a first control signal from said first data signal, said first control signal identifying the intervals at which said synchronizing bits are stored and
   establishing the phase positions of said phase position signal as a function of the phase positions of said first control signal.

3. The method defined in claim 1 comprising the additional step of:
   coupling said first data signal to a third bistable circuit by means of which the phase position of said first data signal is adjusted to be substantially that of the clock frequency in said second system.

4. The method defined in claim 2 comprising the further steps of:
   producing from the clock frequency of said second system through multiplication of its pulse repetition rate a first signal element measuring signal, the pulses of which are applied to a first frequency divider which is reset under the control of said first control signal, said phase position signal being produced through frequency division in said first frequency divider.

5. The method defined in claim 2 wherein said second data signal is derived from said first data signal and from said phase position signal using said first bistable circuit.

6. The method defined in claim 1 wherein said TDM frame signal is produced from said third data signal, said TDM frame signal identifying the interval in which said synchronizing bits are stored, and wherein said blank bit signals are produced responsive to the time intervals of the individual pulses of said TDM frame signal.

7. The method defined in claim 6 comprising the additional steps of:
   producing a frame measuring signal having a value corresponding to the counted value in a counter which operates to count the clock frequency in said second system and which is reset with said TDM frame signal, said frame measuring signal identifying the number of bits in each said TDM frame.

8. The method defined in claim 7 comprising the additional steps of:
   storing said frame measuring signal throughout the duration of a predetermined number of TDM frames,
   generating storage signals in accordance therewith and producing blank bit signals responsive to said storage signals.

9. The method defined in claim 7 comprising the additional steps of:
   multiplying the clock frequency in said second system, dividing said multiplied clock frequency by a frequency division ratio which is varied as a function of said storage signals, the output of said second frequency divider thereby producing a phase-advancing signal.

10. The method defined in claim 9 comprising the additional step of:

generating a data signal containing a constant number of blank bits from a fourth bistable circuit which operates under the control of said phase-advancing signal, said fourth bistable circuit having as inputs said gated outputs of said storage locations.

* * * * *